(12) United States Patent
Chang

(10) Patent No.: US 10,434,903 B2
(45) Date of Patent: Oct. 8, 2019

(54) RECLINER FOR VEHICLE SEAT

(71) Applicant: HYUNDAI DYMOS INCORPORATED, Seosan-si, Chungcheongnam-do (KR)

(72) Inventor: Seung Hun Chang, Hwaseong-si (KR)

(73) Assignee: HYUNDAI DYMOS INCORPORATED, Seosan-si, Chungcheongnam-Do (KR)

( * ) Notice: Subject to any disclaimer, the term of this patent is extended or adjusted under 35 U.S.C. 154(b) by 0 days.

(21) Appl. No.: 15/982,306

(22) Filed: May 17, 2018

(65) Prior Publication Data

US 2018/0361886 A1 Dec. 20, 2018

(30) Foreign Application Priority Data

Jun. 20, 2017 (KR) .................. 10-2017-0078166

(51) Int. Cl.
*B60N 2/22* (2006.01)
*B60N 2/235* (2006.01)

(52) U.S. Cl.
CPC .................. *B60N 2/2356* (2013.01)

(58) Field of Classification Search
CPC .................................................. B60N 2/2356
USPC .............................. 297/367 R, 367 P, 367 L
See application file for complete search history.

(56) References Cited

U.S. PATENT DOCUMENTS

| | | | | |
|---|---|---|---|---|
| 6,082,821 A * | 7/2000 | Baloche | ............... | B60N 2/2358 297/367 R X |
| 7,475,945 B2 * | 1/2009 | Reubeuze | ............ | B60N 2/2358 297/367 R |
| 7,703,852 B2 * | 4/2010 | Wahls | ................... | B60N 2/236 297/367 R |
| 9,376,036 B2 * | 6/2016 | Wei | ........................ | B60N 2/236 |
| 10,093,201 B2 * | 10/2018 | Auer | ................... | B60N 2/2356 |
| 2002/0017811 A1 * | 2/2002 | Cilliere | ................. | B60N 2/236 297/367 R |
| 2002/0053825 A1 * | 5/2002 | Reubeuze | .............. | B60N 2/236 297/367 R |
| 2002/0096924 A1 * | 7/2002 | Reubeuze | ............ | B60N 2/2358 297/367 R |
| 2004/0036338 A1 * | 2/2004 | Lardais | .................. | B60N 2/236 297/367 R |

(Continued)

FOREIGN PATENT DOCUMENTS

| | | | | |
|---|---|---|---|---|
| DE | 19921810 A1 * | 11/2000 | ............. | B60N 2/235 |
| DE | 19956235 A1 * | 6/2001 | ............. | B60N 2/235 |

(Continued)

OTHER PUBLICATIONS

Office Action of corresponding Korean Patent Application No. 10-2017-0078166—4 pages (dated Aug. 21, 2018).

*Primary Examiner* — Rodney B White
(74) *Attorney, Agent, or Firm* — Knobbe Martens Olson & Bear LLP

(57) ABSTRACT

A recliner for a vehicle seat is configured such that a plurality of stop protrusions is provided along an edge of a center hole formed in a control plate, and fore-end corners of the stop protrusions are stopped by the outer circumferential surface of a rod part of an input member when the rod part of the input member passes through the center hole of the control plate, whereby the coupling and assembly of the input member is performed by the stop protrusions of the control plate.

6 Claims, 10 Drawing Sheets

(56) References Cited

U.S. PATENT DOCUMENTS

| | | | | |
|---|---|---|---|---|
| 2004/0061369 | A1* | 4/2004 | Reubeuze | B60N 2/236 297/367 R |
| 2006/0006716 | A1* | 1/2006 | Rohee | B60N 2/2356 297/361.1 |
| 2014/0239693 | A1* | 8/2014 | Nock | B60N 2/20 297/361.1 |
| 2015/0084392 | A1* | 3/2015 | Chang | B60N 2/2356 297/367 P |
| 2015/0306986 | A1* | 10/2015 | Jarry | B60N 2/68 297/362 |
| 2016/0023578 | A1* | 1/2016 | Tame | B60N 2/2356 297/354.12 |
| 2016/0075261 | A1* | 3/2016 | Gallienne | B60N 2/933 16/354 |

FOREIGN PATENT DOCUMENTS

| | | | | |
|---|---|---|---|---|
| FR | 3001927 A1 * | 8/2014 | | B60N 2/2356 |
| KR | 10-2014-0001651 A | 1/2014 | | |
| KR | 10-1690041 B1 | 12/2016 | | |

* cited by examiner

RECLINER FOR VEHICLE SEAT

CROSS REFERENCE TO RELATED APPLICATION

The present application claims priority to Korean Patent Application No. 10-2017-0078166, filed Jun. 20, 2017, the entire contents of which is incorporated herein for all purposes by this reference.

BACKGROUND

Field

The present disclosure relates to a recliner for a vehicle seat, in which it is possible to reduce cost and weight thereof by reducing the number of parts.

Description of the Related Art

A vehicle seat includes a seat back for supporting the upper body of the passenger, a seat cushion for supporting the lower body such as the buttocks and thighs, and a headrest for supporting the back of the head, wherein at a junction of the seat back and the seat cushion, a reclining device is mounted, which allows the angle of the seat back to be adjusted relative to the seat cushion.

The reclining device is divided into a manual-type reclining device, in which the angle of the seat back is adjusted by the passenger manipulating a lever, and a power-type reclining device, which is automatically operated by the power of a motor through manipulating a switch, and reclining devices, regardless of how they work, that have strong coupling between components during the reclining operation can maintain passenger comfort and ensure passenger safety.

Since the space where the recliner is installed in the vehicle seat is narrow, the larger the size the recliner is, the more disadvantageous it is for installation. Also, the larger the number of parts, the more disadvantageous it is for weight and cost reduction. Thus, a smaller size and a smaller number of parts are advantageous for weight and cost reduction.

The foregoing is intended merely to aid in the understanding of the background of the present invention, and is not intended to mean that the present invention falls within the purview of the related art that is already known to those skilled in the art.

SUMMARY

One aspect of the present invention provides a recliner for a vehicle seat, in which when assembling an input member, the input member is coupled and assembled with a control plate disposed between a first plate and a second plate, whereby a separate cap or cover used for assembling the input member can be eliminated, and thus it is possible to reduce the number of parts, the weight, and the cost.

Another aspect provides a recliner for a vehicle seat, the recliner including: a first plate; a second plate configured to be rotated relative to the first plate by being stacked thereon, and provided with internal teeth; a control plate disposed between the first and second plates; and an input member configured to pass through centers of the first and second plates, and the control plate and to be coupled to the control plate and assembled therewith.

The recliner may further include: a locking cam disposed in a space defined between the first and second plates, and coupled to the input member with the input member passing through a center of the locking cam to be rotated therewith; and a plurality of locking gears provided to be brought into contact with an outer circumferential surface of the locking cam, the locking gears being configured to be moved forward toward the internal teeth of the second plate and moved backward away therefrom when the locking cam is rotated, and being provided with external teeth engaged with the internal teeth of the second plate when being moved forward, wherein the control plate is rotated along with the locking cam while connecting the locking cam and the locking gears to each other, and guides forward and backward movement of the locking gear when being rotated along with the locking cam.

The control plate may include a center hole formed at a center thereof to allow the input member to pass through the center hole, and a plurality of stop protrusions protruding from an edge of the center hole, wherein when the input member passes through the center hole, fore-end corners of the stop protrusions are stopped by an outer circumferential surface of the input member.

The outer circumferential surface of the input member with the fore-end corners of the stop protrusions stopped thereby may be formed in a flat surface along a longitudinal direction of the input member.

The outer circumferential surface of the input member may be provided with insertion grooves such that the fore-end corners of the stop protrusions are inserted thereinto and stopped thereby.

The insertion grooves are configured such that a plurality of grooves may be continuously formed along a longitudinal direction of the input member.

According to embodiments of the present invention, since a plurality of stop protrusions is provided along the edge of the center hole of the control plate, and the fore-end corners of the stop protrusions are stopped by the outer circumferential surface of the rod part when the rod part of the input member passes through the center hole, and thus, the coupling and assembly of the input member is performed by the stop protrusions of the control plate, whereby it is possible to reduce the number of parts and the weight, and further, is possible to reduce the cost.

Further, it is possible to minimize the entire diameter of the recliner while ensuring the necessary elasticity of the spring.

Further, when assembling the recliner, it is possible to couple the spring and stably fix the position of the spring.

Further, since the input member is used by modifying the structure of the typical input member, no other mechanical design changes are necessary, and since the spring is wound around the input member and stably locked thereto, durability is improved.

Further, by increasing the elasticity of the spring, it is possible to ensure stability in the case of collisions, and at the same time, it is possible to make the entire diameter of the recliner smaller than the typical one, thereby reducing the weight of moving parts and facilitating design of other parts.

BRIEF DESCRIPTION OF THE DRAWINGS

The above and other aspects, features and other advantages of the present invention will be more clearly understood from the following detailed description when taken in conjunction with the accompanying drawings, in which.

DETAILED DESCRIPTION OF EMBODIMENTS

Figure 1:
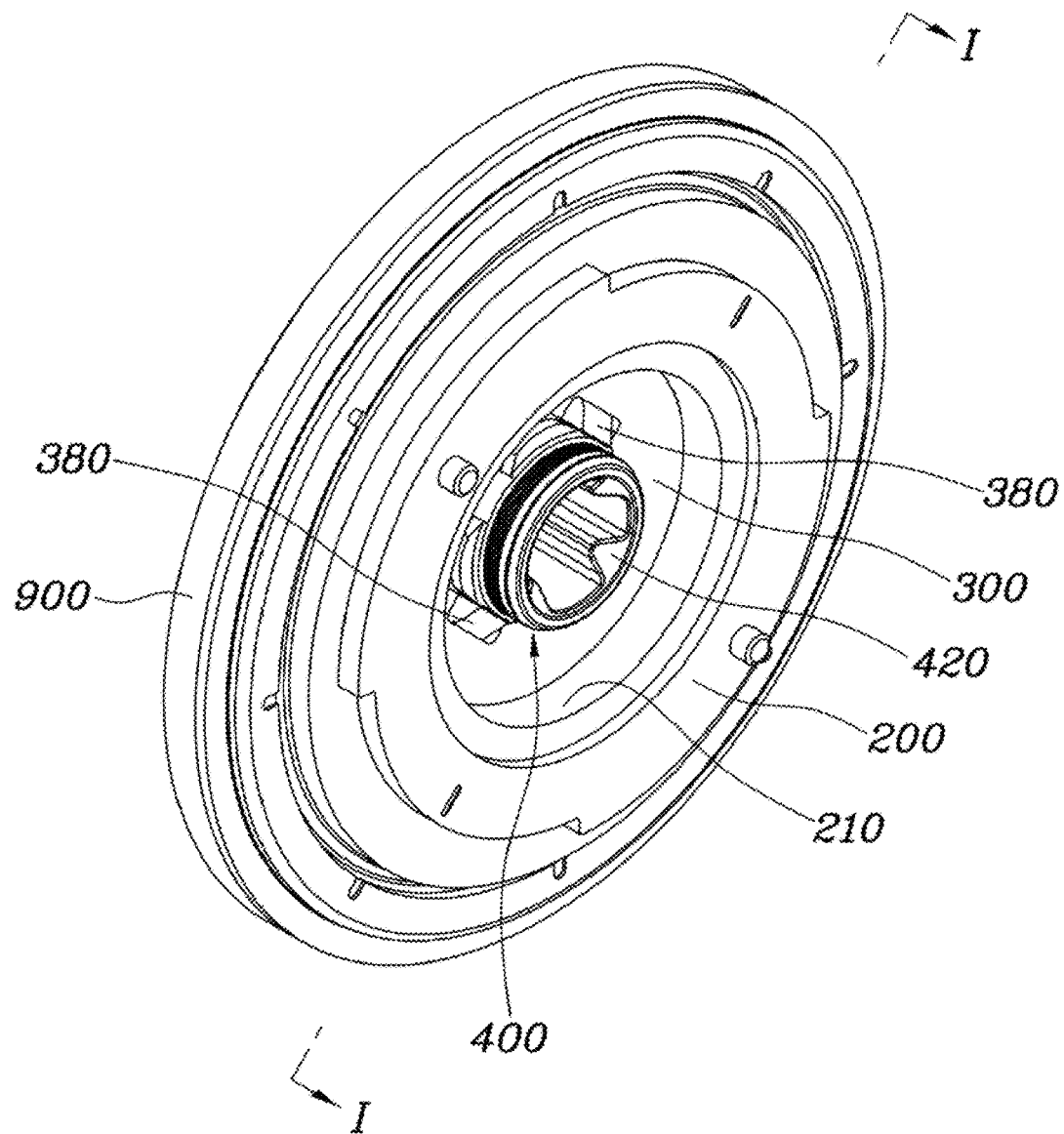
FIG. 1 is a perspective view showing a combined state of a recliner according to embodiments of the present invention.
Figure 2:
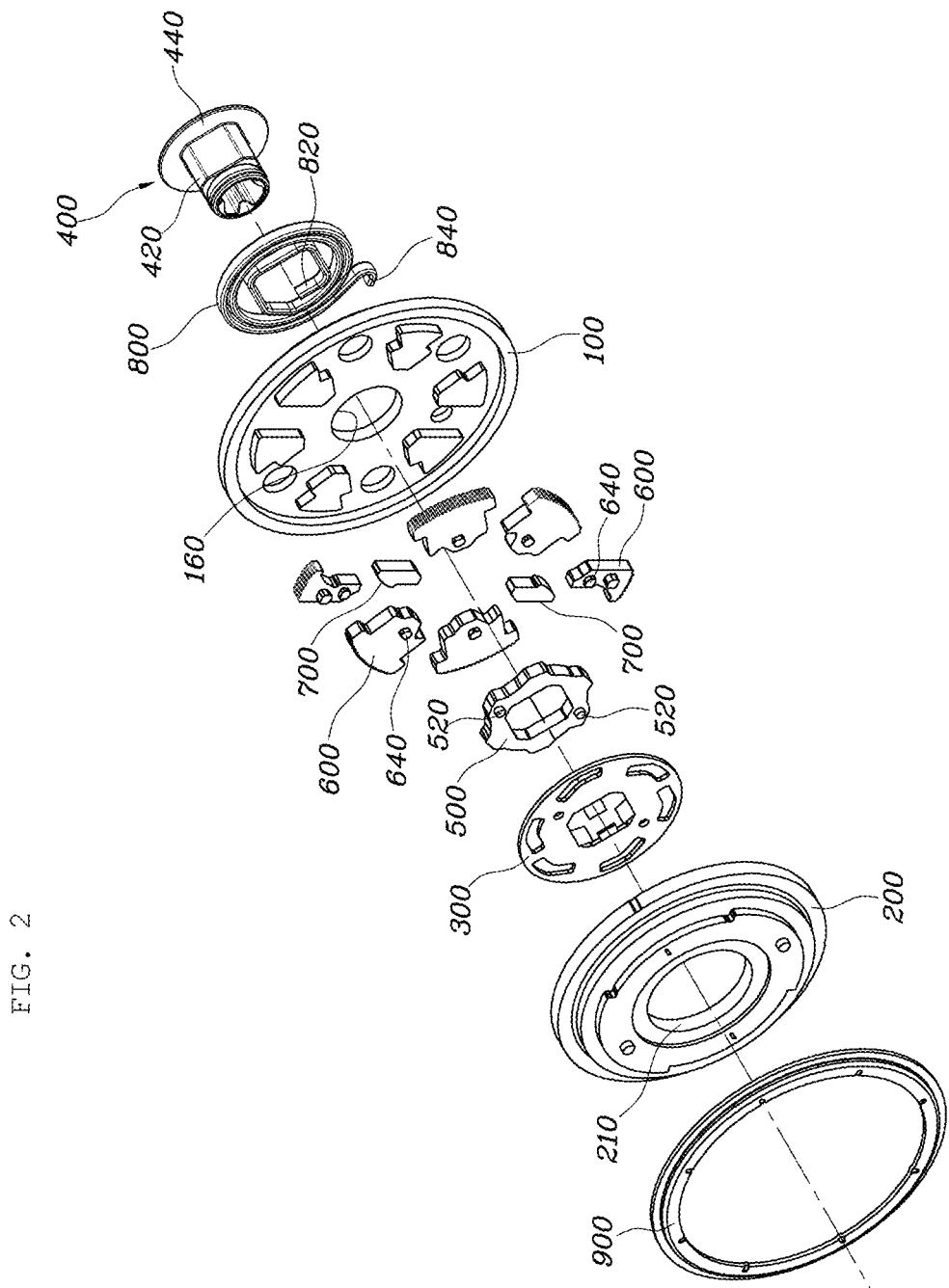
FIG. 2 is an exploded perspective view showing the recliner of FIG. 1.

Hereinbelow, a recliner for a vehicle seat according to an embodiment of the present invention will be described in more detail with reference to the accompanying drawings.

As shown in FIGS. 1 to 10, a recliner for a vehicle seat according to embodiments of the present invention includes: a first plate 100; a second plate 200 configured to be rotated relative to the first plate 100 by being stacked thereon, with an inner space 120 defined therebetween, and provided with INTERNAL TEETH 220 along an inner circumferential surface thereof; a control plate 300 disposed in the inner space 120 between the first and second plates 100 and 200; an input member 400 configured to pass through centers of the first and second plates 100 and 200, and the control plate 300, and to be coupled to the control plate 300 and assembled therewith; a locking cam 500 disposed in the inner space 120 between the first and second plates 100 and 200, and coupled to the input member 400 with the input member passing through a center of the locking cam to be rotated therewith; a plurality of locking gears 600 provided to be brought into contact with an outer circumferential surface of the locking cam 500, configured to be moved forward toward the internal teeth of the second plate (moved away from the input member to be away from each other) and moved backward away therefrom (moved toward the input member to be close to each other) when the locking cam 500 is rotated, and provided with external teeth 620 engaged with the INTERNAL TEETH 220 when being moved forward.

The control plate 300 connects the locking cam 500 and the locking gears 600 together while being stacked on one sides of the locking cam 500 and the locking gears 600, is rotated along with the locking cam 500, and serves to guide forward and backward movement of the locking gears 600 when being rotated along with the locking cam 500.

The control plate 300 includes a center hole 320 formed at a center thereof to allow the input member 400 to pass through the center hole, and two coupling holes 340 and six guide holes 360 formed at locations outside the center hole 320.

The locking cam 500 is provided with two coupling protrusions 520 on a side thereof, wherein the coupling protrusions 520 are fitted into the coupling holes 340 of the control plate 300.

The six locking gears 600 are provided, and a side of each locking gear 600 is provided with a guide protrusion 640 formed by protruding, wherein the guide protrusion 640 is inserted into the guide hole 360 of the control plate 300 and coupled therewith.

Some locking gears of the locking gears 600 are provided to be coupled with sub-cams 700.

The number of guide holes 360 of the control plate 300 is the same as the number of locking gears 600, and the numbers thereof may be changed to various numbers depending on the design.

Accordingly, when the input member 400 is rotated, the locking cam 500 and the control plate 300 are rotated together, and the locking gears 600 are moved forward and backward in response to the rotation of the control plate 300, wherein when the locking gears 600 are moved forward, the INTERNAL TEETH 220 and the external teeth 620 are engaged with each other, and when the locking gears 600 are moved backward, the INTERNAL TEETH 220 and the external teeth 620 are disengaged from each other.

Further, the sub-cams 700 are used to absorb dimensional tolerances of the locking gears and to maintain a more rigid engagement of the internal teeth 220 and the external teeth 620, and may not be used depending on the design.

Further, the recliner according to embodiments of the present invention further includes an elastic member 800 disposed on an outer side of the first plate 100, wound around the input member 400, and configured such that a first end 820 thereof is stopped by the input member 400, and a second end 840 thereof is stopped by a plate protrusion 140 protruding from the first plate 100, thereby providing a restoring force after the input member 400 is rotated.

The recliner for a vehicle seat is provided with the first plate 100, and the second plate 200 that is coupled with the first plate 100 to define the inner space 120 and is configured to be rotated relative to the first plate 100. In the embodiment, the first plate 100 is fixed to a seat frame of a vehicle, the second plate 200 is fixed to a seat back frame and is capable of relative rotation while being in contact with the first plate 100. Accordingly, based on the first plate 100, the rotation of the second plate 200 is locked through the locking gears 600, whereby an angle between the seat back and a seat cushion is locked, and the angle of the seat back is adjusted when the second plate 200 is rotated.

Figure 4:
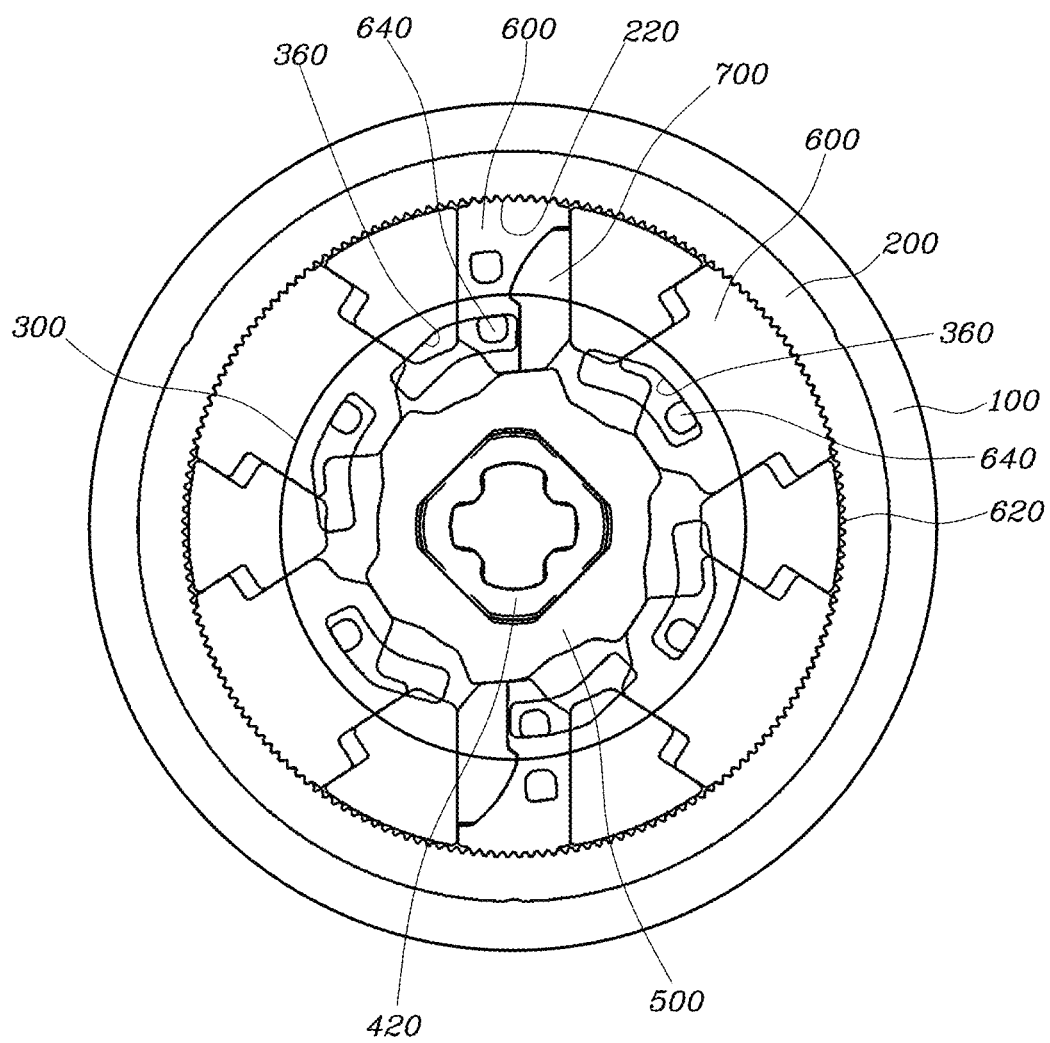
FIG. 4 is a view showing a locking cam and a locking gear according to embodiments of the present invention.
Figure 5:
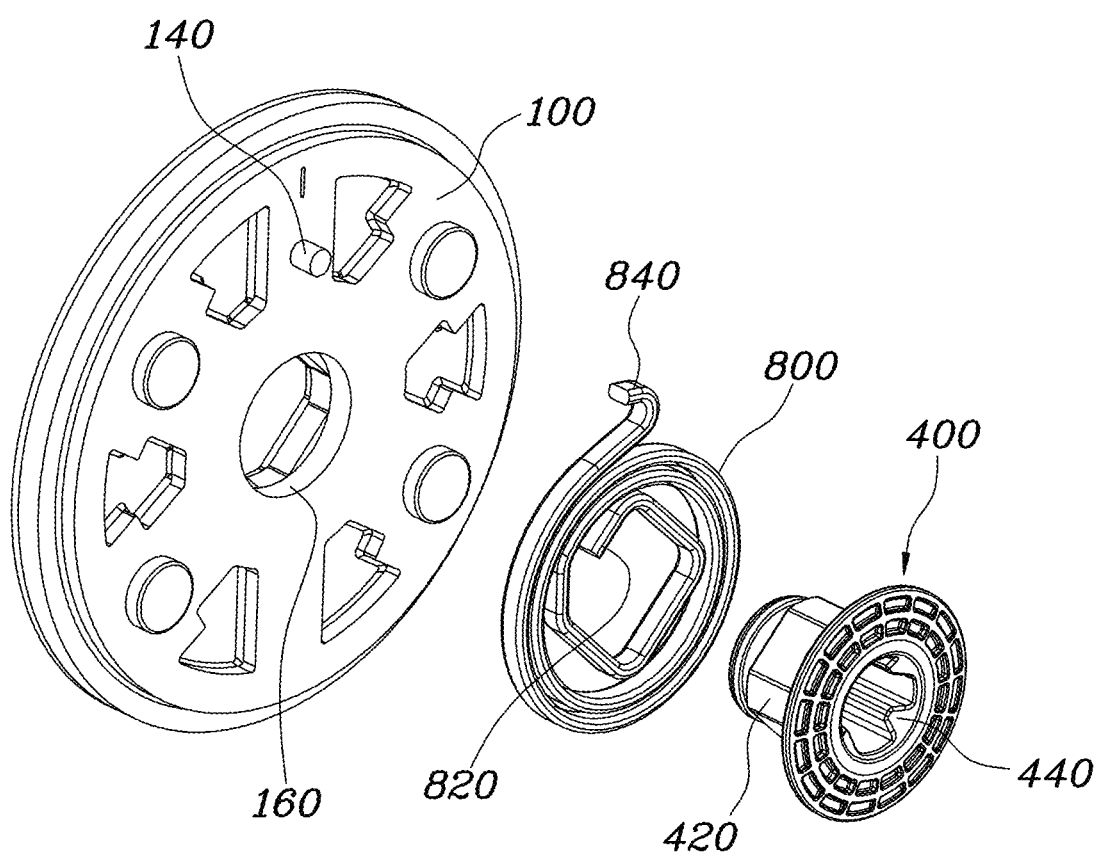
FIGS. 5 to 6 are views showing an input member and an elastic member according to embodiments of the present invention.
Figure 6:
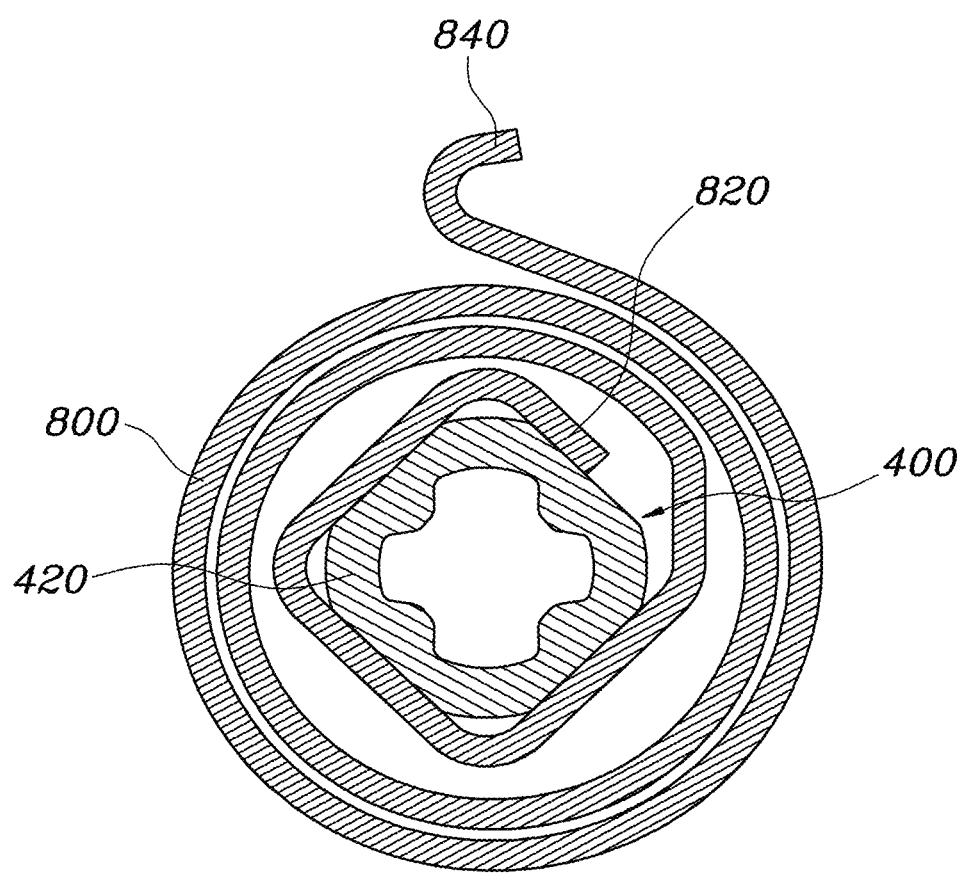
Figure 7:
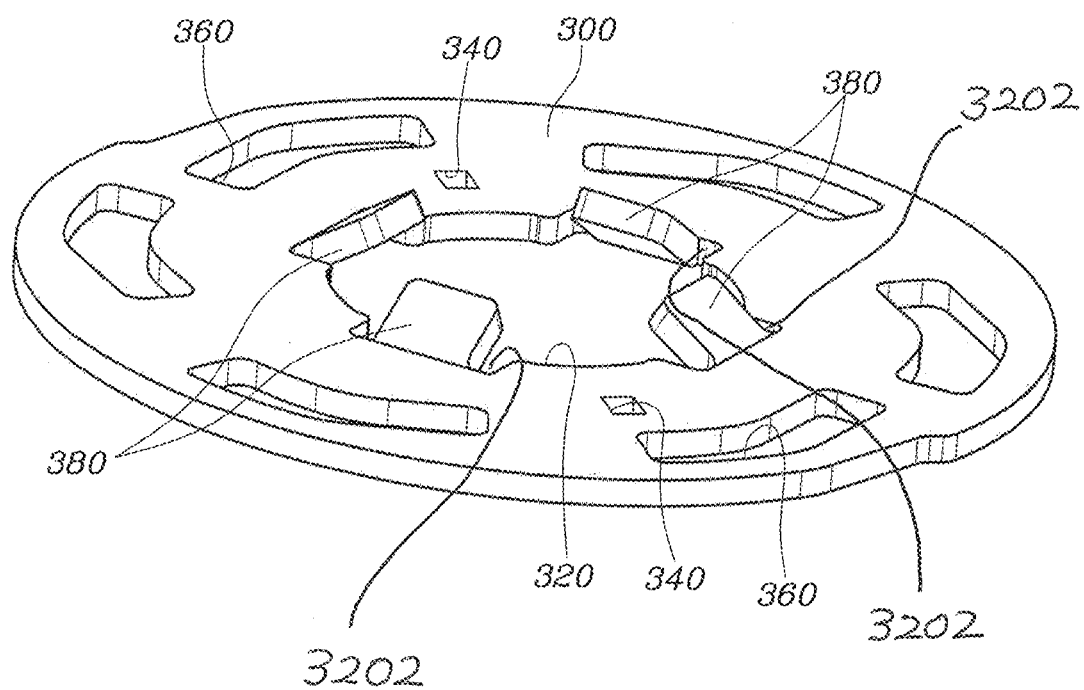
FIG. 7 is a view showing a control plate according to embodiments of the present invention.

In the inner space 120 between the first plate 100 and the second plate 200, the locking gears 600 with the external teeth 620 are disposed, and the locking gears 600 only perform a linear motion of forward or backward motion on the first plate 100, whereby when the locking gears 600 are moved forward such that the internal teeth 220 of the second plate 200 and the external teeth 620 of the locking gears 600 are engaged with each other, the recliner is locked, and the angle of the seat back is locked, which is shown in FIG. 4.

Further, when the locking gears 600 are moved backward such that the internal teeth 220 and the external teeth 620 are disengaged from each other, the second plate 200 is rotated relative to the first plate 100, whereby the angle of the seat back can be adjusted.

In order for the locking gears 600 to be constantly pressed against the internal teeth 220 of the second plate 200, the locking cam 400 constantly presses the locking gears 600 in a forward direction, and to achieve this, the locking cam 500 is generally designed to be applied with an elastic force in the pressure direction by a spring.

Further, in a typical recliner, the spring providing the elastic force for locking is generally configured to directly press the locking cam 500 or the locking gears 600 in the inner space 120 defined by the first plate 100 and the second plate 200. This is because durability of the spring is closely related to the stability of a vehicle in the case of a collision, and accordingly, manufacturers are reluctant to expose the spring to the outside to ensure durability of the spring, and believe that the spring should directly press the locking gears 600 or the locking cam 500, which is related to the rotation.

However, when the spring is provided inside, it is very difficult to select the type and size of the spring due to the limit of the inner space 120. If it is intended that the spring be made small to make it better for design, it is difficult to obtain the required elasticity of the spring. On the contrary, if it is intended to sufficiently secure the elasticity of the spring, it is difficult for the spring to be mounted in the inner space 120 due to its type or size.

One embodiment of the present invention is configured such that sufficient strength is obtained by making the spring a spiral spring, and it is advantageous in terms of inertia and weight by reducing the size of the reclining device more than the typical reclining device by providing the spring to the outside, and further, external exposure of the spring is minimized by modifying the typical structure, thereby stably ensuring durability.

To be more specific, the locking gears 600 according to embodiments of the present invention are provided in the inner space 120, and each of the locking gears is provided with the external teeth 620 engaged with the internal teeth 220 of the second plate 200. Further, the locking cam 500 is configured to move the locking gears 600 forward or backward through a rotational motion.

Torque of the locking cam 500 is transmitted through the input member 400, and the input member 400 includes a rod part 420 and a flange part 440.

The rod part 420 of the input member 400 is configured to be coupled with the locking cam 500 by passing through the centers of the first plate 100, the locking cam 500, and the second plate 200, thereby transmitting torque to the locking cam 500.

Further, the elastic member 800 as the spring according to embodiments of the present invention is disposed on the outer side of the first plate 100, is wound around the input member 400, and is configured such that the first end 820 thereof is stopped by the input member 400, and the second end 840 thereof is stopped by the plate protrusion 140 protruding from the first plate 100, thereby providing a restoring force after the input member 400 is rotated, whereby the input member 400 provides the elastic force to the locking cam 500 all the time, and the locking cam 500 presses the locking gears 600 in the forward direction, thereby locking the seat back at all times.

As described above, since the spring is provided to the outside and is configured to provide the elastic torque to the locking cam 500 through the input member 400, the stability of locking is greatly increased when compared with the small spring of a typical recliner which directly presses the locking cam 500 or the locking gears 600 in the inside.

Figure 3:
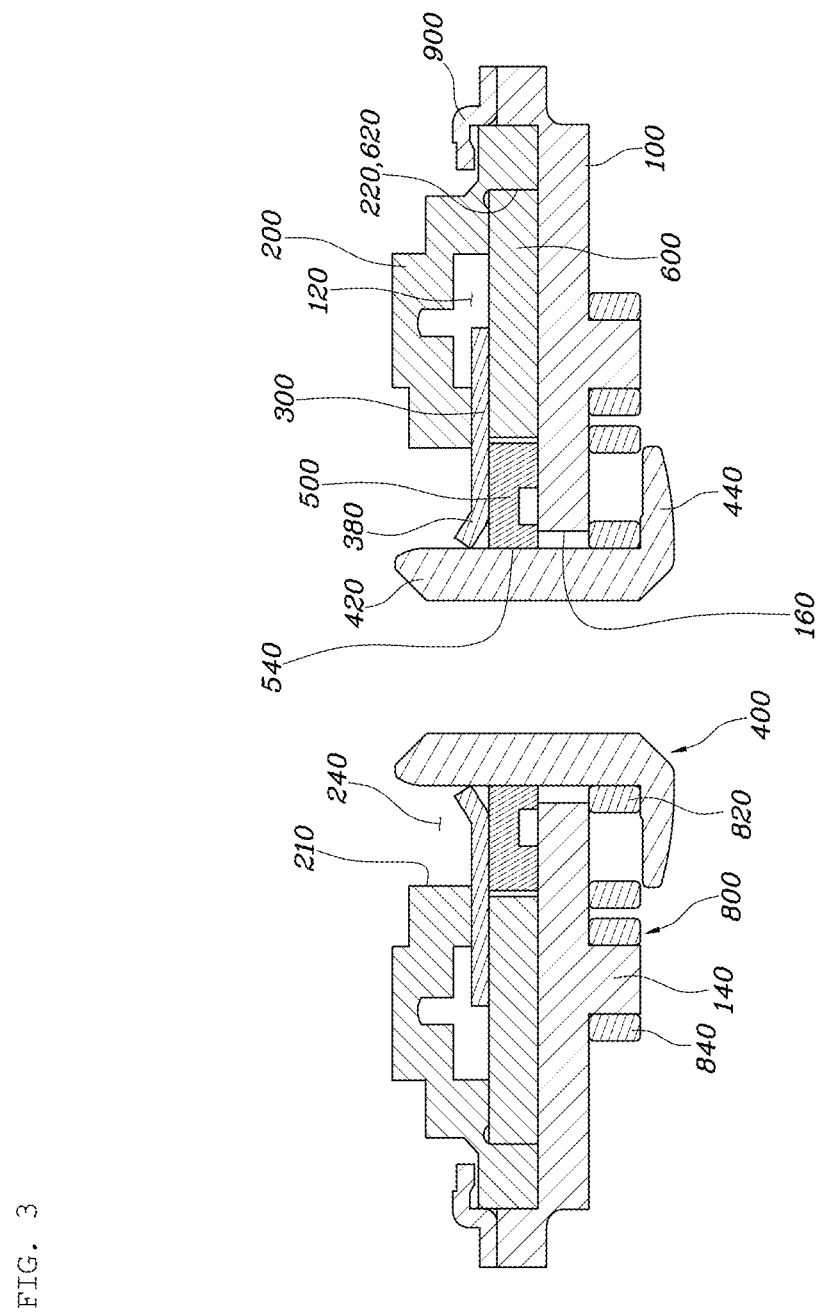
FIG. 3 is a sectional view taken along line I-I of FIG. 1.

Further, as shown in FIG. 3, the spring is eliminated from the inner space 120 between the first and second plates 100 and 200, whereby the entire thickness of the recliner is reduced, the rigidity is improved due to the simple shapes of both the first plate 100 and the second plate 200, and since the weight of moving parts is reduced, they are freer in inertia.

The centers of the first plate 100 and the locking cam 500 may be provided with a first hole 160 and a cam hole 540, respectively, and the rod part 420 of the input member 400 may be coupled with the locking cam 500 after passing through the first hole 160 of the first plate 100 and being inserted in the cam hole 540 of the locking cam 500 in the inner space 120. In other words, after the assembly of the first plate 100, the second plate 200, and the inner parts is finished, the spring can be simply coupled from the outside.

Further, the input member 400 may be rotated relative to the first plate 100, and may be rotated along with the locking cam 500 by being coupled thereto. Thereby, it is possible to perform locking or unlocking, and it is appropriate that the spring is stopped by the input member 400 since the torque is transmitted from the outside.

In particular, as shown in the drawings, the input member 400 may have a cross section in a quadrangular shape configured such that each corner has a curvature, the first hole 160 may be a ring-shaped hole that comes into contact with the each corner of the input member 400, and the cam hole 540 may be in the same shape as the cross section of the input member 400. Thereby, even though the input member 400 is in a quadrangular shape, it can be rotated by being supported by the first plate 100 through the first hole 160. Further, the input member is inserted into the cam hole 540 through its quadrangular cross section, to be stably locked to the locking cam 500, whereby it is possible to transmit torque without clearance.

Further, the center of the second plate 200 is formed with a second hole 210 with the rod part 420 of the input member 400 passing therethrough, and the diameter of the second hole 210 is formed to be larger than the outer diameter of the rod part 420 of the input member 400.

Meanwhile, the elastic member 800 may be in a form of a spiral spring configured such that after the spring is wound a plurality of times in a state where the first end 820 thereof is stopped by the rod part 420 exposed outside the first plate 100, and the second end 840 thereof is stopped by the plate protrusion 140 formed on the outer side of the first plate 100. By applying the spiral spring, long-term performance can be maintained in terms of providing elasticity.

Further, the elastic member 800 may be wound a plurality of times on a virtual co-planar surface in a state of being in contact with the outer side of the first plate 100. Thereby, it is possible to minimize the thickness of the spring while obtaining its rigidity, and particularly, such a spiral spring has to be secured in its radial size, so it can be free from such restriction by being installed outside.

Further, the rod part 420 of the input member 400 may have a cross section in a quadrangular shape configured such that each corner has a curvature, and the first end 820 of the elastic member 800 may be in the quadrangular same shape as the cross section of the rod part 420 of the input member 400. Accordingly, it is possible to maintain mutual interlocking with only a quadrangular shape without an additional coupling means or the like, thereby simplifying locking.

Further, the bent second end of the elastic member 800 may be in a hook shape to be coupled with first plate 100 by being hooked to the plate protrusion 140. Accordingly, the elastic member can store the elastic force by being deformed when the input member 400 is rotated.

In the input member 400, an end of the rod part 420 is integrally provided with the annular flange part 440 extending outside, and the elastic member 800 is disposed between the outer side of the first plate 100 and the flange part 440 of the input member 400. Through this structure, it is possible to prevent the spring from being exposed outside as much as possible, whereby it is possible to prevent contamination of the spring itself and to maintain its durability, in particular, to prevent the spring from being twisted in an axial direction, thereby ensuring stability of operation.

Meanwhile, in the embodiment of the present invention, when the rod part 420 of the input member 400 passes through the first hole 160 of the first plate 100, the cam hole 540 of the locking cam 500, the center hole 320 of the control plate 300, and the second hole 210 of the second plate 200, the rod part 420 is coupled with the control plate 300, thereby being assembled.

In other words, the control plate 300 is formed with the center hole 320 to allow the rod part 420 of the input member 400 to pass therethrough, and a plurality of stop protrusions 380 is provided along an edge of the center hole 320, wherein the stop protrusions 380 protrude toward inside the center hole 320 while protruding toward a side of the control plate 300 in a direction where the rod part 420 passes through the center hole 320. The center hole of the control plate is provided with a plurality of recessed edge portions 3202 being spaced apart from each other, and the stop protrusions 380 are formed to have an upward inclined angle while extending from the recessed edge portions 3202 toward inside the center hole.

Accordingly, when the rod part 420 of the input member 400 passes through the center hole 320 of the control plate 300, fore-end corners of the stop protrusions 380 are stopped by the outer circumferential surface of the rod part 420, and thus, the embodiment of the present invention has a structure in which the coupling and assembly of the input member 400 is performed by the stop protrusions 380 of the control plate 300.

In a typical recliner, to lock and couple the input member 400, a separate cap or cover is inserted into a space 240 between the second hole 210 of the second plate 200 and the rod part 420, and the cap or cover is assembled to the input member 400 by coupling the second plate 200 and the input member 400 to the rod part 420.

Accordingly, in a typical recliner, since a separate cap or cover is used for coupling and assembly of the input member 400, the number of parts increases, the weight increases, and accordingly, the cost rises.

However, according to the embodiment of the present invention, as described above, the plurality of stop protrusions 380 is provided along the edge of the center hole 320 of the control plate 300 such that the fore-end corners of the stop protrusions 380 are stopped by the outer circumferential surface of the rod part 420 when the rod part 420 of the input member 400 passes through the center hole 320, and thus, the coupling and assembly of the input member 400 is performed by the control plate 300, whereby it is possible to reduce the number of parts and the weight, and further, is possible to reduce the cost since a cap or cover used in a typical recliner is not required.

Figure 8:
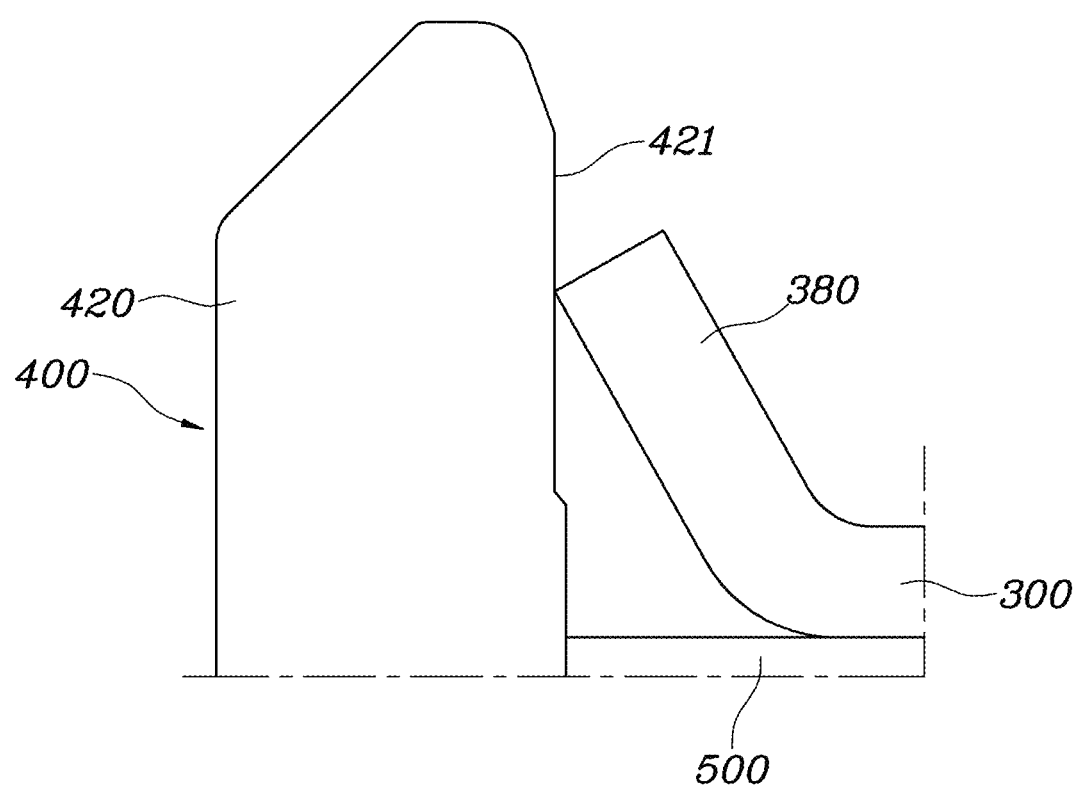
FIGS. 8, 9 and 10 are views showing embodiments of a coupling structure between a rod part of the input member and stop protrusions of the control plate according to embodiments of the present invention.

In embodiments of the present invention, as shown in FIG. 8, the outer circumferential surface of the rod part 420 with the fore-end corners of the stop protrusions 380 stopped thereby may be formed in a flat surface 421 along a longitudinal direction of the rod part 420 (a longitudinal direction of the input member), so that a worker can adjust the coupling and assembly position of the input member 400 more easily.

Figure 9:
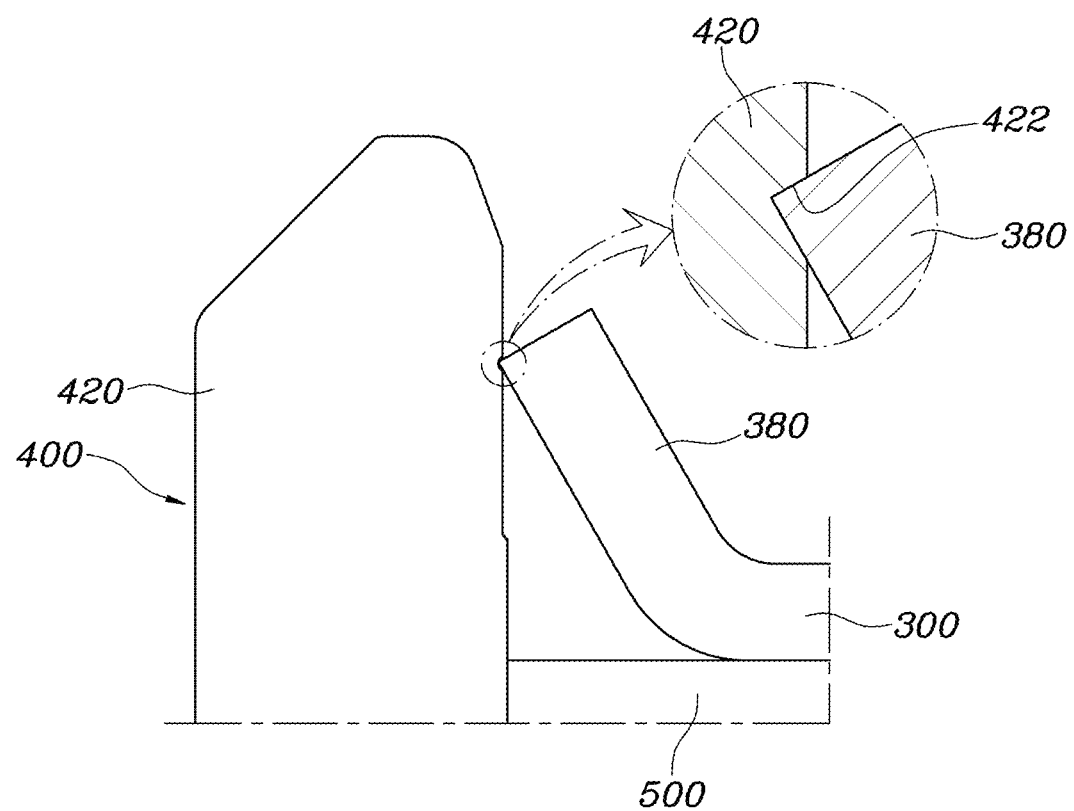

Further, as shown in FIG. 9, the outer circumferential surface of the rod part 420 of the input member 400 may be provided with insertion grooves 422 such that the fore-end corners of the stop protrusions 380 are inserted into the insertion grooves 422 and stopped thereby, and in this case, the rod part 420 of the input member 400 and the stop protrusions 380 can be more firmly coupled.

Figure 10:
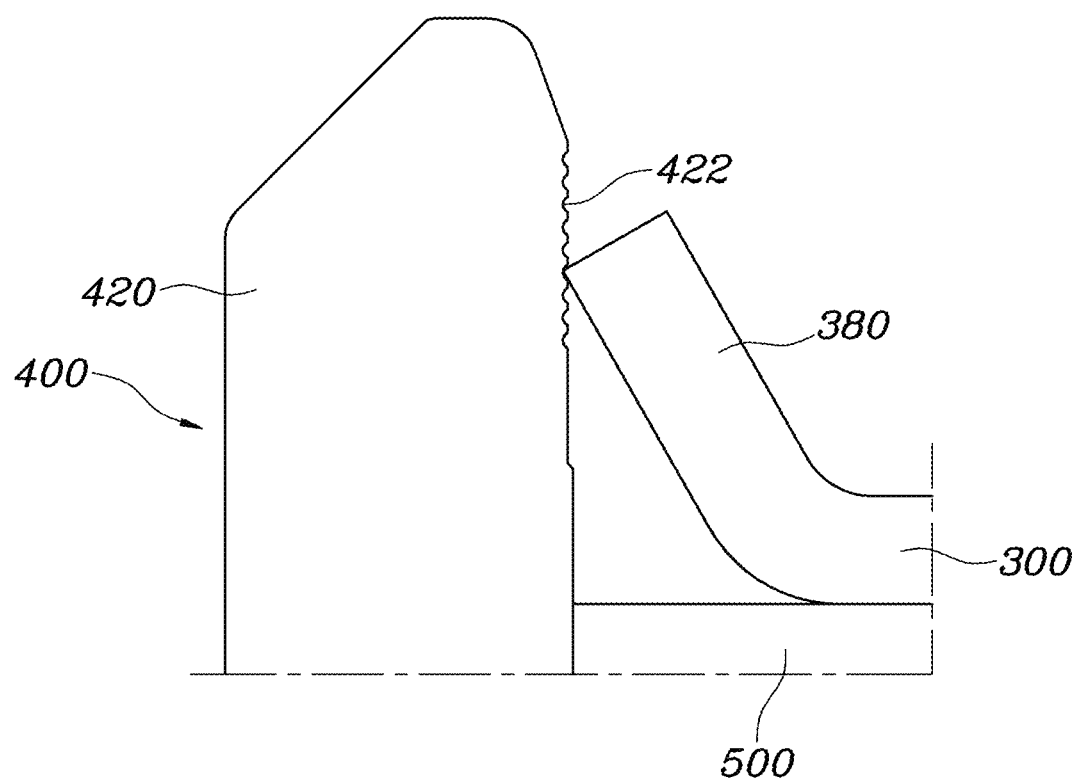

Further, as shown in FIG. 10, the insertion grooves 422 formed in the rod part 420 may be configured such that a plurality of grooves is continuously formed along the longitudinal direction of the rod part 420 (the longitudinal direction of the input member), and in this case, a worker can adjust the coupling and assembly position of the input member 400 more easily, and also, the rod part 420 of the input member 400 and the stop protrusions 380 can be more firmly coupled.

Reference numeral 900 denotes a retainer, and the retainer 900 is welded to the first plate 100 while covering the outer edge of the second plate 200.

As described above, the embodiment of the present invention is configured such that the plurality of stop protrusions 380 is provided along the edge of the center hole 320 of the control plate 300, and the fore-end corners of the stop protrusions 380 are stopped by the outer circumferential surface of the rod part 420 when the rod part 420 of the input member 400 passes through the center hole 320, and thus, the coupling and assembly of the input member 400 is performed by the stop protrusions 380 of the control plate 300, whereby it is possible to reduce the number of parts and the weight, and further, is possible to reduce the cost.

The recliner according to embodiments of the present invention is further advantageous in that it is possible to minimize the entire diameter of the recliner while ensuring the necessary elasticity of the spring.

Further, when assembling the recliner, it is possible to couple the spring and stably fix the position of the spring.

Further, since the input member is used by modifying the structure of the input member used in a typical recliner, no other mechanical design changes are necessary, and since the spring is wound around the input member and stably locked thereto, durability is improved.

Further, by increasing the elasticity of the spring, it is possible to ensure stability in the case of collision, and at the same time, it is possible to make the entire diameter of the recliner smaller than the a typical one, thereby reducing the weight of moving parts and facilitating design of other parts.

Although embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A recliner for a vehicle seat, the recliner comprising:
 a first plate;
 a second plate configured to be rotated relative to the first plate by being stacked thereon, and provided with internal teeth;
 a control plate disposed between the first and second plates; and
 an input member configured to pass through centers of the first and second plates, and the control plate and to be coupled to the control plate and assembled therewith,
 wherein the control plate includes a center hole formed at a center thereof to allow the input member to pass through the center hole, and a plurality of stop protrusions protruding from an edge of the center hole, wherein when the input member passes through the center hole, fore-end corners of the stop protrusions are stopped by an outer circumferential surface of the input member,
 wherein the center hole of the control plate is provided with a plurality of recessed edge portions being spaced apart from each other, and the stop protrusions are formed to have an upward inclined angle while extending from the plurality of recessed edge portions toward inside the center hole, wherein the control plate includes coupling holes formed at locations between the plurality of recessed edge portions outside the center hole to be coupled with a locking cam located between the control plate and the first plate.

2. The recliner of claim 1, further comprising:

the locking cam disposed in a space defined between the first and second plates, and coupled to the input member with the input member passing through a center of the locking cam to be rotated therewith; and a plurality of locking gears provided to be brought into contact with an outer circumferential surface of the locking cam, the locking gears being configured to be moved forward toward the internal teeth of the second plate and moved backward away therefrom when the locking cam is rotated, and being provided with external teeth engaged with the internal teeth of the second plate when being moved forward, wherein the control plate is rotated along with the locking cam while connecting the locking cam and the locking gears to each other, and guides forward and backward movement of the locking gear when being rotated along with the locking cam.

3. A recliner for a vehicle seat, the recliner comprising:

a first plate;

a second plate configured to be rotated relative to the first plate by being stacked thereon, and provided with internal teeth;

a control plate disposed between the first and second plates; and an input member configured to pass through centers of the first and second plates, and the control plate and to be coupled to the control plate and assembled therewith, wherein the control plate includes a center hole formed at a center thereof to allow the input member to pass through the center hole, and a plurality of stop protrusions protruding from an edge of the center hole, wherein when the input member passes through the center hole, fore-end corners of the stop protrusions are stopped by an outer circumferential surface of the input member, wherein the control plate further includes coupling holes formed at locations outside the center hole to be coupled with a locking cam, and guide holes formed at locations outside the coupling hole to guide the locking gears.

4. The recliner of claim 1, wherein the outer circumferential surface of the input member with the fore-end corners of the stop protrusions stopped thereby is formed in a flat surface along a longitudinal direction of the input member.

5. The recliner of claim 1, wherein the outer circumferential surface of the input member is provided with insertion grooves such that the fore-end corners of the stop protrusions are inserted thereinto and stopped thereby.

6. The recliner of claim 5, wherein the insertion grooves are configured such that a plurality of grooves is continuously formed along a longitudinal direction of the input member.

* * * * *